Feb. 18, 1964    M. F. A. JULIEN    3,121,402
VEHICLES MOUNTED ON TRUCKS
Filed May 18, 1961    4 Sheets-Sheet 2

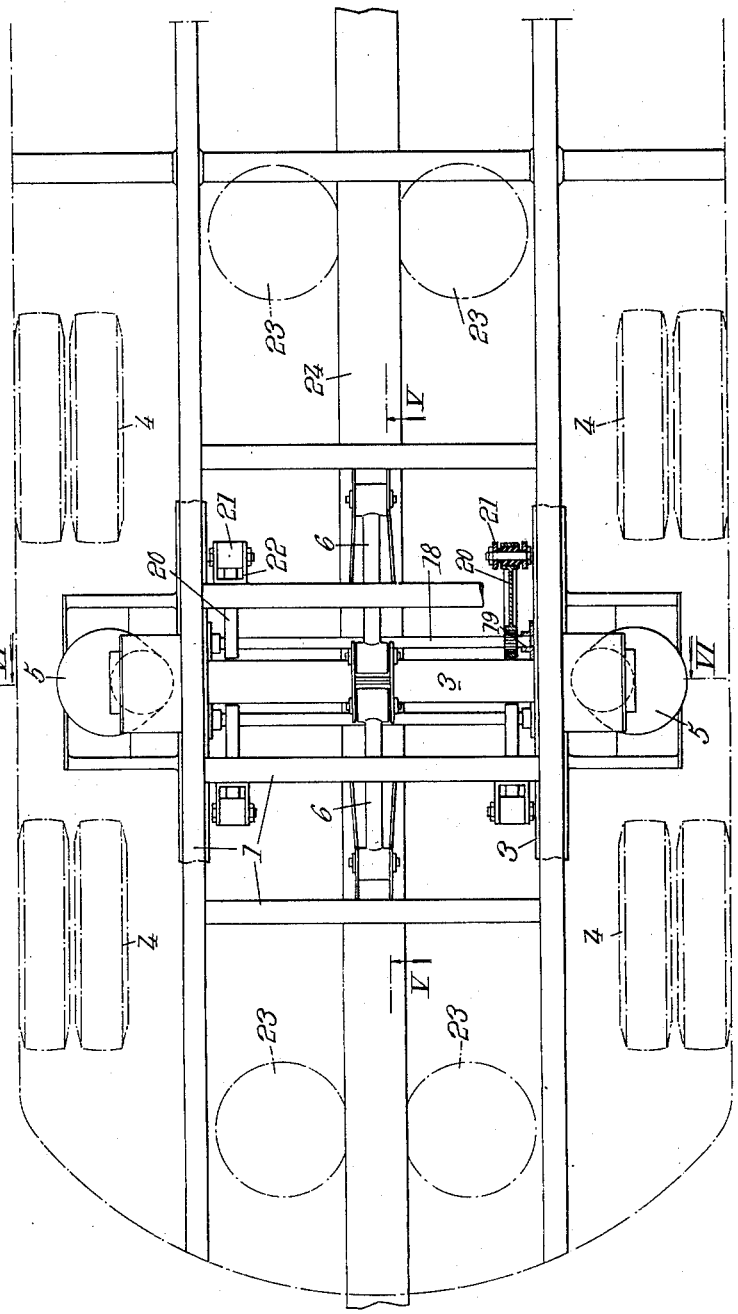

United States Patent Office 3,121,402
Patented Feb. 18, 1964

3,121,402
VEHICLES MOUNTED ON TRUCKS
Maurice Francois Alexandre Julien, Paris, France,
assignor to Society Usines Paulstra, a society of
France
Filed May 18, 1961, Ser. No. 110,913
Claims priority, application France May 24, 1960
6 Claims. (Cl. 105—171)

The present invention relates to track vehicles comprising a body mounted on trucks provided with wheels running on a track for instance a railway track.

The object of the present invention is to provide a vehicle of this type which is better adapted to meet the requirements of practice than those known up to the present time.

According to the present invention, in order to connect the vehicle body with each of the trucks use is made of four links swivelled at their ends respectively to said body and to said frame, the axes of the two first links, which are supporting links, being for the straight position of the truck, disposed in the middle transverse place of the truck frame symmetrically with respect to the middle vertical longitudinal plane of symmetry of this frame and being slightly inclined to the vertical so as to have their intersection located above the truck, the axes of the two other links, which are driving links, being for the straight position of the truck and the middle position of the body in coincidence, or practically so, with a horizontal line of the vertical longitudinal plane of symmetry of the truck frame, means being further provided for constantly urging the frame of the truck resiliently toward its straight position with respect to the body and/or the body toward its vertical position.

Other features of this invention will become apparent in the course of the following detailed description of some embodiments thereof.

Preferred embodiments of this invention will be hereinafter described with reference to the appended drawings given merely by way of example and in which, FIG. 1 is a diagrammatic plan view, with parts in section, of a truck used in a vehicle made according to this invention;

FIG. 4 is a view similar to FIGURE 1 but relating to a modification;

Figure 1:
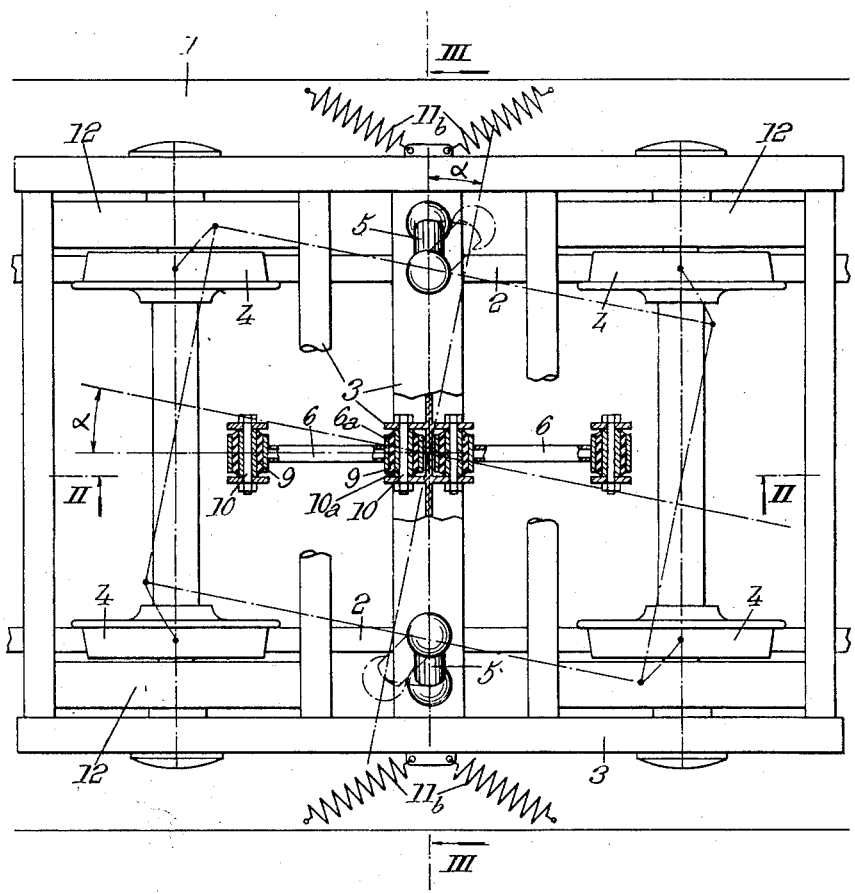

The vehicle according to this invention comprises a body 1 and it is intended to run on a railway track 2.

The drawings show a truck supporting said body 1, said truck comprising a rigid frame 3 mounted on the axles of wheels 4 running on rails 2.

In trucks as known up to now, there is usually provided a bolster movable transversely with respect to the frame and carrying a pivot pin. This bolster and this pin are heavy and encumbering.

According to the present invention these elements are replaced by a system consisting essentially of four links which are swivelled at their ends respectively to the frame and to the body.

Two of these links, i.e. supporting links 5, are mounted in the middle transverse plane of the frame and the two other ones, i.e. driving links 6, extend horizontally in the vertical plane of symmetry of same plane.

In a first embodiment of this invention illustrated by FIGS. 1, 2 and 3 and relating to a railway truck, the above mentioned links are made as follows:

The supporting links 5 are rigid cylindrical elements, the ends of which are of spherical shape. These two links 5 are disposed symmetrically with respect to the vertical longitudinal plane of symmetry of frame 3, the upper spherical ends of the links cooperating with corresponding sockets 7 fixed with respect to body 1. The upper ends of links 5 are at a smaller distance from each other than their lower ends, which cooperate with sockets 8 carried by frame 3.

Each of the driving links 6 consists of a rod provided at each end with a sleeve 6a perpendicular to said rod. This sleeve comprises, tightly fitted therein, an annular member 9 of rubber or an elastomer and inside member 9 there is also fitted a pin 10a fixed by means of a bolt 10 between two lugs rigid either with frame 3 or with body 1. Preferably member 9 is adhering to sleeve 6a and to pin 10a.

The four links 5 and 6 transmit to frame 3 the load of body 1 and serve to guide the body and the truck frame with respect to each other. The vertical transmissions between the body and the truck frame are essentially ensured by supporting links 5 and the horizontal transmissions (guiding, braking, acceleration) are ensured by driving links 6. However, the body can oscillate with respect to frame 3 about the point of intersection of the axes of supporting links 5 and the truck can also pivot with respect to the body about a vertical axis.

FIG. 1 shows in dotted lines the position of the truck having turned through an angle α with respect to the body.

Resilient means are provided for constantly urging the frame and the body toward their normal relative positions (straight position for the truck and vertical position for the body) such means consisting for instance of springs (11a for transverse displacements, 11b for pivoting displacements) interposed between the truck frame and the body.

Resilient suspension means are further provided, such as leaf springs 12 interposed between frame 3 and the axles of wheels 4.

Figure 5:
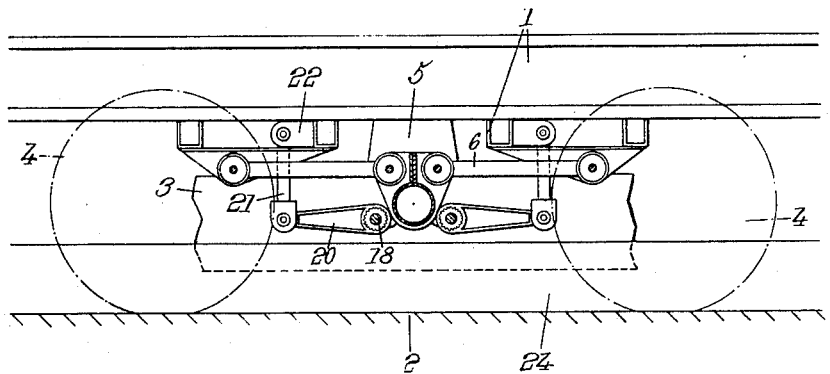
FIGS. 5 and 6 are sectional views, respectively on the lines V—V and VI—VI of FIG. 4.
Figure 6:
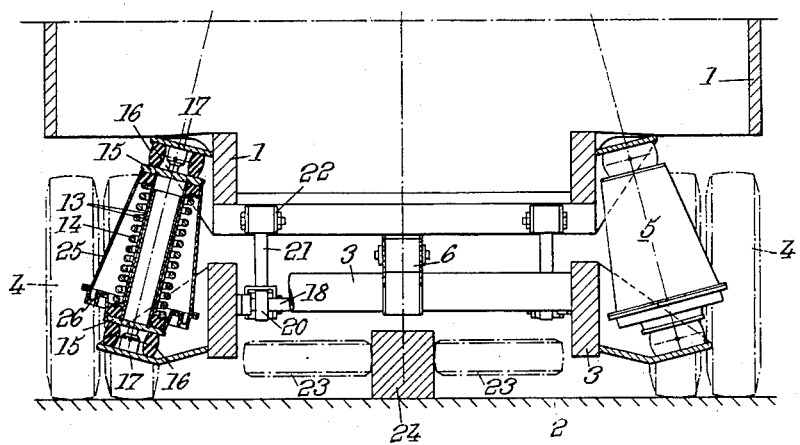

FIGS. 4 to 6 relate to a vehicle the wheels of which are to be fitted with pneumatic tires.

In this case supporting links 5 are telescopic structures comprising each two tubular elements 13 slidable in each other (FIG. 6) and a helical compression spring 14 surrounding said elements 13 and interposed between plates 15 rigid with said elements respectively.

The swivelling connections between these links 5 and frames 3 or body 1 are ensured by resilient members 16, the transverse section of which is of general elliptical shape, the major axis of the ellipse being perpendicular to the plane of the middle line of the member. These members 16 are interposed between one of the plates 15 and another plate 17 rigid either with the truck frame or with the body.

Such connections are described and illustrated in the French patent No. 1,263,909 filed by the Société Luxembourgeoise de Brevets et de Participations (Lubrepa) on May 2, 1960 for "Improvements in means for constituting an elastic connection between two parts of system."

The driving rods 6 are analogous to those above described. In this construction it is not necessary to provide special resilient suspension means between frame 3 and the axles of wheels 4 since the resiliency of the supporting links 5 combined with that of the pneumatic tires mounted on wheels 4 is sufficient.

Figure 3:
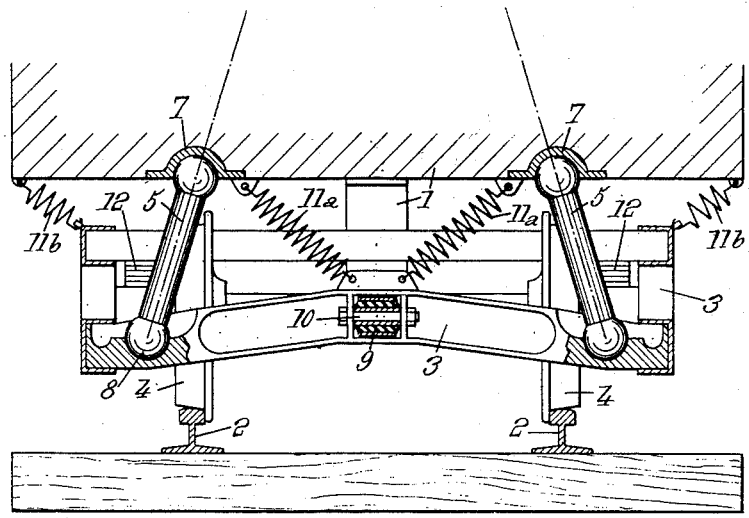
FIG. 3 is a transverse sectional view on the line III—III of FIG. 1.
Figure 2:
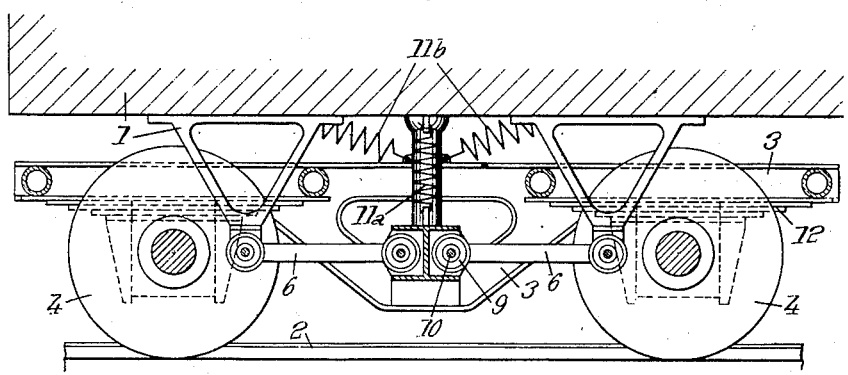
FIG. 2 is a vertical longitudinal section on the line II—II of FIG. 1.

In this construction the resilient return means comprise, in addition to the transverse returns springs of the kind of those shown by FIGS. 1, 2 and 3, the following elements:

Transverse torsional rods 18 freely pivotable in bearings 19 rigidly mounted on frame 3;

Longitudinal levers 20 each fixed to one end of one of the rods 18; and

Vertical connecting rods 21 pivoted through resilient means including a rubber annular member analogous to the above described member 9, on the one hand, at their upper ends to body 1 (to be more accurate to an extension 22 of this body) and the other hand at their lower ends to the free end of one of the levers 20.

It will be easily understood that each of the systems formed by a torsion bar 18 and levers 20 and 21 associated therewith opposes lateral inclinations of body 1 resulting from the resiliency of links 5.

In FIGS. 4 and 6, reference numeral 23 designates wheels mounted on vertical axes for horizontal guiding of the truck by rolling of said wheels along a longitudinal rail 24 made for instance of concrete.

According to a modification, instead of transmitting the whole of the load of body 1 to frame 3 exclusively through mechanical springs such as above described springs 14, these springs support only a portion of said load whereas another portion of the load is taken care of by the adjustable pressure of compressed air enclosed in a gastight chamber interposed between the truck frame and the body.

FIG. 6 shows such an arrangement, this chamber being limited at both ends by the above mentioned plates 15, metal walls 25 surrounding the telescopic system 13—14 and a resilient diaphragm 26.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A frame vehicle which comprises, in combination, a body having a longitudinal plane of symmetry and at least two trucks for supporting said body, each of said trucks comprising wheels, a frame supported by said wheels and having a longitudinal plane of symmetry, two upwardly extending supporting links swivelled at their lower ends to said truck at respective points thereof located symmetrically with respect to the longitudinal plane of symmetry of said truck and on opposite sides thereof, said points being located in the middle transverse plane of said frame, the upper ends of said two supporting links being swivelled to said body at respective fixed points thereof located symmetrically with respect to the longitudinal plane of symmetry of said body, the distance between the two last mentioned points, located on said body, being smaller than the distance between the two first mentioned points, located on said truck frame, two driving links having respective ends thereof swivelled to said frame at respective points thereof located close to each other substantially in the longitudinal plane of symmetry of said frame and close to said middle transverse plane thereof, said driving links extending from said last mentioned points respectively toward the front and toward the rear in substantially horizontal directions, said driving links having their other ends swivelled respectively to points of said body located in the longitudinal plane of symmetry thereof, the four last mentioned points being so located, on said truck and said body respectively, that said supporting links are in said middle transverse plane of said frame when said two longitudinal planes of symmetry coincide together, and resilient means carried by said truck and connected to said body for urging said truck and said body toward a relative position where their respective longitudinal planes of symmetry coincide together.

2. A vehicle according to claim 1 wherein said supporting links are solid rigid elements, further including resilient suspension means interposed between said truck frame and said wheels.

3. A vehicle according to claim 1 wherein said supporting links are telescopic elements, further including resilient means inserted between the ends of each of said supporting means so as yieldingly to oppose shortening deformations thereof.

4. A vehicle according to claim 1, including, between each of said supporting link ends and the part of the truck or the body to which is swivelled a device comprising two plates carried by said supporting link and said part respectively and facing each other and at least one member of resilient material interposed between said plates so as to be compressed by them, the transverse section of said annular member being of general elliptical shape, with the major axis transverse to the plane of the middle line of said member, said resilient member being guided for relative movements of rotation.

5. A vehicle according to claim 1 including, between each of said driving link ends and the part of the truck or the body to which it is swivelled, a sleeve rigid with said driving link and perpendicular thereto, a pin coaxial with said sleeve and rigid with said part, and an annular rubber element caught between said sleeve and said pin and adhering thereto.

6. A vehicle according to claim 1 further comprising torsion bar stabilizing means interposed between said truck and said body.

References Cited in the file of this patent

UNITED STATES PATENTS

| 1,117,294 | Wilson | Nov. 17, 1914 |
| 2,011,918 | Stedefeld et al. | Aug. 20, 1935 |

FOREIGN PATENTS

| 1,066,650 | France | Jan. 20, 1954 |